US 6,567,736 B1

(12) United States Patent
Danz et al.

(10) Patent No.: US 6,567,736 B1
(45) Date of Patent: May 20, 2003

(54) SPEED DIFFERENCE REGULATION OF A SWITCHABLE FRICTIONAL ENGAGEMENT CONTROL

(75) Inventors: Wolfgang Danz, Friedrichshafen (DE); Andreas Piepenbrink, Meersburg (DE); Andreas Schwenger, Friedrichshafen (DE)

(73) Assignee: ZF Batavia L.L.C., Batavia, OH (US)

( * ) Notice: Subject to any disclaimer, the term of this patent is extended or adjusted under 35 U.S.C. 154(b) by 0 days.

(21) Appl. No.: 09/831,034

(22) PCT Filed: Nov. 3, 1999

(86) PCT No.: PCT/EP99/08393

§ 371 (c)(1),
(2), (4) Date: May 3, 2001

(87) PCT Pub. No.: WO00/28231

PCT Pub. Date: May 18, 2000

(30) Foreign Application Priority Data

Nov. 6, 1998 (DE) .......................... 198 51 341

(51) Int. Cl.$^7$ .................. F16D 48/00; B60K 41/06
(52) U.S. Cl. ................. 701/67; 701/60; 477/50
(58) Field of Search ............... 701/67, 68, 60; 474/70; 477/39, 50

(56) References Cited

U.S. PATENT DOCUMENTS

| | | | |
|---|---|---|---|
| 4,793,454 A | * 12/1988 | Petzold et al. | 192/103 R |
| 5,179,875 A | * 1/1993 | Brown | 477/154 |
| 5,283,738 A | 2/1994 | Schwab et al. | 364/424.1 |
| 5,322,150 A | 6/1994 | Schmidt-Brücken et al. | 477/176 |
| 5,571,060 A | * 11/1996 | Becker et al. | 477/149 |
| 5,630,773 A | 5/1997 | Slicker et al. | 477/176 |
| 5,697,867 A | 12/1997 | Kono et al. | 477/176 |
| 5,790,967 A | * 8/1998 | Kull et al. | 192/3.58 |
| 5,967,918 A | * 10/1999 | Knapp et al. | 318/491 |

FOREIGN PATENT DOCUMENTS

| | | |
|---|---|---|
| DE | 39 24 632 A1 | 2/1990 |
| DE | 38 33 623 A1 | 4/1990 |
| DE | 39 37 976 A1 | 5/1990 |
| DE | 42 17 270 A1 | 12/1993 |
| DE | 196 06 311 A1 | 8/1997 |

* cited by examiner

Primary Examiner—Michael J. Zanelli
(74) Attorney, Agent, or Firm—Davis & Bujold, P.L.L.C.

(57) ABSTRACT

Within the scope of the method for regulating the rotational speed difference of a switchable frictional engagement control, specially of a clutch or brake, in the driving train of a motor vehicle by means of a control closed loop with the desired rotational speed difference as reference input and the actual rotational speed difference as controlled variable, together with the clutch pressure or brake pressure to be adjusted, at least one other controlled variable is used, wherein the closed loop comprises a linear governor and damping members (TP1, TP2, TP3) in a manner such that the time shift of the damped variable per reading step does not exceed a predetermined value so that the exciting of the closed loop remains within a stable range for controlling.

12 Claims, 1 Drawing Sheet

SPEED DIFFERENCE REGULATION OF A SWITCHABLE FRICTIONAL ENGAGEMENT CONTROL

FIELD OF THE INVENTION

Figure 1:
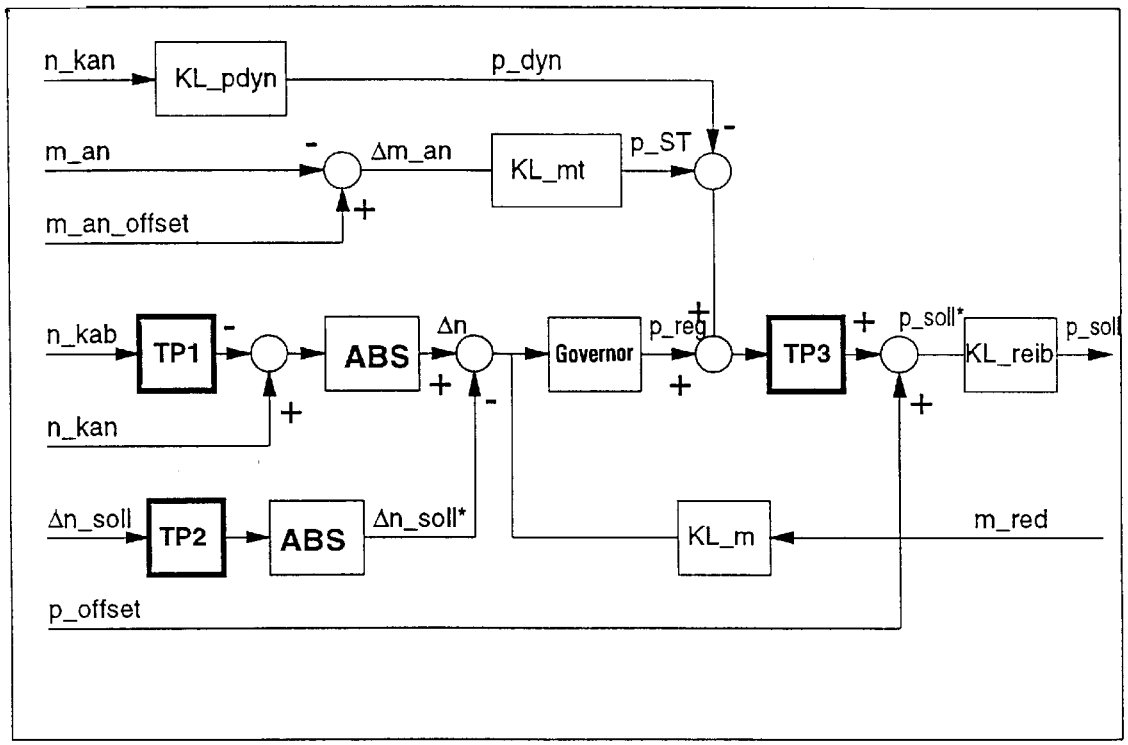

This invention relates to a method for rotational speed difference regulation of a switchable frictional engagement control.

BACKGROUND OF THE INVENTION

According to the prior art an automatic transmission contains a hydrodynamic torque converter with converter lock-up clutch, at least one planetary set and two switchable frictional engagement controls in the form of a friction clutch or transmission brake, which serve to transmit torque.

Such frictional engagement controls are hydraulically closed. The opening as a rule is assisted by recoil springs. The arrangement of the components described allows a mechanical interruption of the drive train so that the input and output sides are entirely or also partly uncoupled. Said uncoupling divides the rotational speeds on the input from those on the output so that to a certain extent a torsional oscillation uncoupling is also possible.

In the present state of the art, frictional engagement controls (clutches, brakes) are used in the automatic transmission for different tasks or functions. One of the most important requirements in all clutch functions is to make possible in all driving modes a comfortable closing. It must here be ensured that the closing be comfortably secured over large rotational speed ranges of engine and output, the same as under different engine torques.

Furthermore, there are special operating modes where it is functionally necessary to adjust and maintain on one or more clutches or brakes defined rotational speed differences (slip). The driver must not feel as disturbing the transitions between the separate functions.

To satisfy said requirements, conventional solutions distinguish between different load states and depending thereon require changing parameters or even different control structures.

The Applicant's DE 196 06 311 A1 discloses a closed lop control structure which based on a mathematical-physical model of the control system compensates in the form of a front-mounted correction member the essential non-linearities thus arriving in a control technical manner to a linear substitute control systems so that it be possible to use a simple linear governor to guide the controlled variable. Interferences such as outer torques acting upon the clutch are taken into account via a correction member.

One disadvantage of this method is the need of knowing a mathematical-physical path model, the quality of which directly influences the control quality attainable.

Therefore, this invention is based on the problem of indicating, on the basis of the cited prior art, a method for rotational speed difference regulation of a switchable frictional engagement control in a manner such that without knowing a mathematical-physical model the frictional engagement control so regulated takes over the transition between open and closed state, the same as the adjustment of a defined slip value, wherein the control design for each required utilization of the switchable frictional engagement control is identically constructed and takes care of an increased shifting and, driving comfort.

Besides, the inventive method should be utilizable for controlling any torque-transmitting clutches or brakes in the drive train. A linear governor must be used for this.

In addition the inventive method must take into consideration a prior existing knowledge of the path model but also in case of incomplete knowledge of the model ensure a sufficient sturdiness and control quality in all operating modes.

The method furthermore should allow a defined engine engagement for improving the control quality.

SUMMARY OF THE INVENTION

It is accordingly proposed, in a closed loop control for regulation of the rotational speed difference of a switchable frictional engagement control and specially of a clutch or of a brake, to provide with the desired rotational speed difference as reference input and the actual rotational speed difference as controlled variable, together with the clutch pressure to be adjusted, at least one other controlled variable and to provide the closed loop control with damping members so that the time shift of the damped variables per reading step does not exceed a predetermined value so that the exciting of the closed loop control remains in the stable range according to control technology.

According to the invention the engine torque is preferably used as added controlled variable.

It is also possible within the scope of the invention to take into account interferences, specially the actual turbine torque.

By using the inventive method the above mentioned disadvantages of the prior art appear no more. Besides, by virtue of he inventive total design switches of the control designs and regulating parameters are no longer needed.

BRIEF DESCRIPTION OF THE DRAWING(S)

Figure 2:
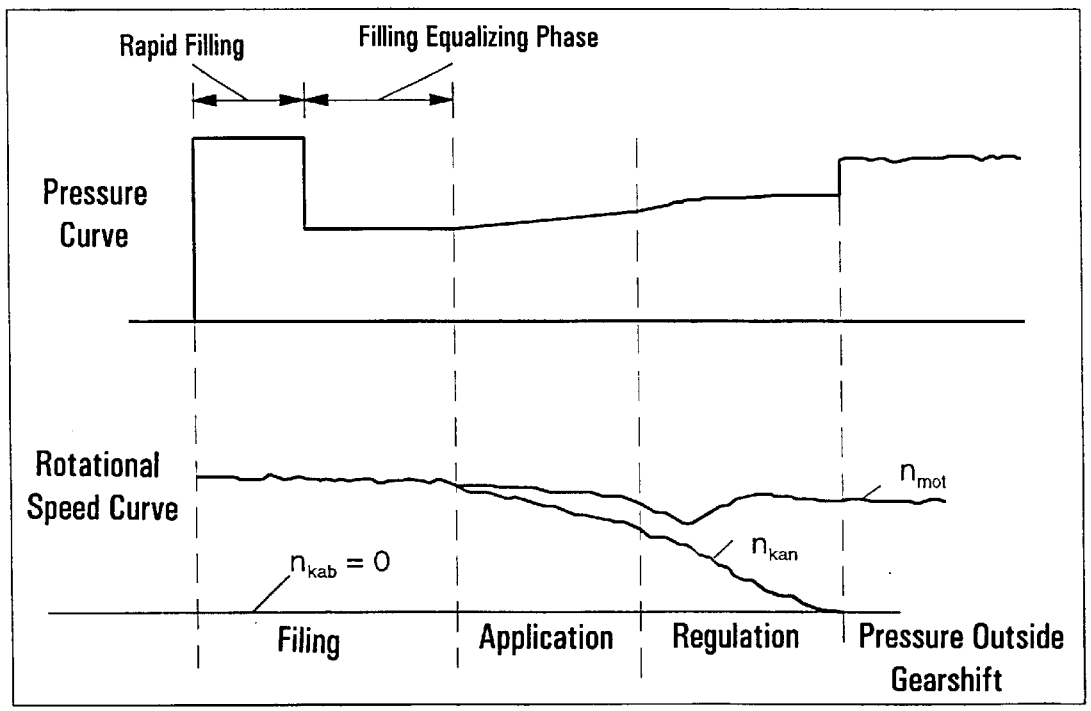

The invention is described in detail herebelow with reference to the drawing enclosed of a clutch. In the drawing:

FIG. 1 is a general closed loop control structure according to this invention; and FIG. 2 is a fundamental representation of the pressure and rotational speed curves when controlling a clutch in the stationary state of the vehicle according to this invention.

DETAILED DESCRIPTION OF THE INVENTION

According to FIG. 1 the desired rotational speed difference $Dn\_soll$ is the reference input of the inventive closed loop control. The desired rotational speed difference $\Delta n\_soll$ is here continuously equalized in time by means of a damping member TP2 or limited to a defined value per reading step so as to prevent unsteadiness in the timed curve of the reference input. TP2 is preferably designed as low-pass filter. The module ABS services for the absolute value formation prior to calculating the input variable for the governor.

The input variable for the governor is the actual control difference. It is formed from the difference between the absolute value of the desired rotational speed difference value and the absolute value of the actual rotational speed difference value of the input and output. From this variable is calculated the pressure value p reg, designated as control portion which acts as direct controlled variable of the linear governor (Governor).

To calculate the actual rotational speed difference $\Delta n$, the rotational speeds of the clutch input side $n\_kan$ and of the clutch output side $n\_kab$ are first detected. Before the difference is formed, the variable $n\_kab$ is equalized by means of a first damping member and preferably of a low-pass filter TP1. A damping of the input rotational speed n__kan can also be optionally provided. The absolute value of the actual rotational speed difference is formed in the module ABS.

As already mentioned, thereafter is formed the control difference which corresponds to the sign-provided difference of the absolute values of the actual and desired rotational speed difference.

According to the invention, when the difference between the actual rotational speed difference and the dynamic desired value exceeds certain threshold, the engine torque as added controlled variable is reduced via the engine electronics with the aid of the engine engagement according to the control difference.

The amount of the reduction is a function of the size of the controlled difference. The engine engagement itself can be implemented by the engine via the standard methods (firing angle engagement, filling change, or others).

The necessity of an engine engagement is detected by the module KL__m, the signal for the reduction torque m__red is inputted to module. KL-M, which performs a control difference-reduction torque conversion, and the output of KL-M is passed to the Governor.

The manner of the engagement is selected so that the reaction time between the requirement and the actual torque reduction of the input be as short as possible.

This engagement reduces the torque to be transmitted to the clutch whereby the adjusting energy to be applied by the governor diminishes. As consequence, the comfort of the closing operation is increased and the clutch linings are less heavily loaded.

According to another aspect of this invention, the actual input torque of the clutch is taken into account as interference. This corresponds to the a priori model knowledge and thus describes the states in the actual working point.

The interference portion of the clutch pressure p__ST resulting therefrom is converted here from the sign-provided divergence between the actual torque m__an and the working point position m__an__offset, via a calculation block KL__mt, into a corresponding equivalent pressure $p_{st}$ according to the equation $$p_{st} = \Delta m\_an * \frac{1}{\mu(\Delta n) \cdot r \cdot z \cdot A_K}$$

with:
$\Delta m\_an$ divergence torque at the working point
$\mu(\Delta n)$: friction coefficient
$\Delta n$: rotational speed difference on the clutch
r medium frictional radius of the clutch
z number of friction linings
$A_K$ piston surface
p__ST pressure difference calculated on the working point,
wherein dynamic pressure portions subject to construction are taken into account by thereafter reducing the variable p__ST by the corresponding dynamic of rotatory pressure portion p__dyn. The rotatory pressure portion p__dyn is calculated from the input rotational speed n__kan in the module KL__pdyn.

The time shift of the total adjusting variable clutch pressure which is formed from the control portion p__reg and the interference portion p__ST, is equalized, according to the invention, in the module TP3 or limited to a defined value per reading step. It is thereby ensured that the exciting of the closed loop remains within the stable range for controlling.

As start value for the control phase is used the application or opening pressure of the shifting element p__offset is determined during each shift at the beginning of the control phase.

To determine the application or opening pressure of the shifting element p__offset, the procedure is the following:

According to FIG. 2 during the clutch control the four phases filling phase, application phase, regulation phase and phase outside the shifting operation are in general differentiated, the rotational speed curves of engine n__mot, primary and secondary pulleys, respectively n__kan, n__kab, and the pressure curve assuming different values in each phase.

When the shifting element is pressureless, within the filling phase, before the desired regulation of the rotational speed difference, the clutch/brake must be brought forward to the working point.

This is done by the so-called rapid filling with subsequent filling equalizing phase. After the filling phase is terminated, each additional pressure increase leads directly to an increase of the torque transmitted by the clutch.

The purpose of the application phase is to find as exactly as possible the working point of the clutch. While in the preceding filling phase the working point can be driven only relatively roughly due to tolerances and time-dependent system parameters, with the application phase a kind of "fine tuning" of the working point takes, place.

This occurs by the control carefully touching on the working point, the effect upon the control system being controlled in each step. Consequently, as explained herebelow, the starting values for the control are defined in the control phase by the application phase.

During the control phase the clutch is regulated with the object of adjusting a defined rotational speed difference (desired value) or a defined rotational speed difference curve (desired value curve).

After termination of the shifting operation, the clutch, in completely closed state, is loaded with a specific pressure according to superposed criteria. The control pressure is here at least strong enough for the clutch to be able to transmit the full input-side torque.

The pressure value p__offset is determined according to the operating mode as follows:.

a) Change from the state "clutch open:
After the already explained filling equalizing phase, the control pressure is gradually increased according to a predetermined gradient within the scope of a control phase until a reaction is to be detected with the aid of the rotational speed difference of input side and output side of the clutch. This reaction consists in that the rotational speed difference diminishes by a defined threshold value. The pressure value predetermined in this state as desired value is used as start value p__offset of the subsequent control phase.

b) Change from the state "clutch closed":
The control pressure of the clutch is gradually reduced according to a predetermined gradient until exceeding a threshold value of the rotational speed difference between input and output sides of the clutch whereby an opening of the clutch is indicated. Here is also used as start value p__offset for the subsequent control phase the pressure value predetermined as desired value in this state.

Before the total adjusting variable clutch pressure increase by p__offset is superposed on the control system, there results according to the invention as last step in the calculation block KL_reib a correction relative to the rotational speed dependence of the friction coefficient.

Within the scope of the inventive method, the clutch in open state is closed for introduction of gear, the filling phase being first carried out in order to bring the clutch in gear. Only after the filling phase is the shifting element led to the desired rotational speed-difference in the control phase. To close the clutch, the desired rotational speed difference is set to zero according to the invention.

When within the scope of other functions defined rotational speed differences (slip) are to be adjusted and maintained in the clutch, the work is done with the same control structure. Only the value of the desired rotational speed difference curve (desired value for the control) is modified accordingly.

Let it also be mentioned that the inventive method can be used in any torque-transmitting clutch or brake.

Within the scope of one variant of the invention, by means of the measured temperature of the transmission oil combined with a mathematical-physical model of the heat input in the slip operation of the clutch, a temperature monitoring of the clutch is effected in order to prevent overheating and thus damage or destruction of the clutch linings.

References $m_{anOffset}$ torque on the frictional engagement control in the working point
$m_{an}$ actual torque on the frictional engagement control
$n_{kan}$ rotational speed primary disc
$n_{kab}$ rotational speed secondary disc
$\Delta n_{soll}$ desired value of rotational speed difference on the frictional engagement control
$P_{Offset}$ pressure of the frictional engagement control int eh working point
$P_{soll}$ desired pressure on the frictional engagement control
$m_{red}$ reduction torque input
TP low-pass filter
ABS formation of absolute value
governor digital governor
Beg step width limitation of the controlled variable
$K1_{reib}$ inversely regulated frictional value chracteristic
$K1_{mt}$ torque-pressure conversion
$K1_m$ conversion of control difference-reduction torque
nmot engine rotational speed
$\Delta m_{an}$ divergence torque at working point
$\mu(\Delta n)$ frictional value
$\Delta n$ rotational speed difference on the frictional engagement control
r central friction radius of the frictional engagement control
z number of friction linings
$A_k$ piston surface
$P_{st}$ pressure difference calculated on the working point

What is claimed is:

1. A method for the closed loop control of a rotational speed difference regulation of a switchable frictional engagement control in the drive train of a motor vehicle, comprising the steps of:

a) determining an actual rotational speed difference of an input side and an output side of the frictional engagement control wherein the rotational speed of the output side is equalized and limited;

b) determining a control pressure for the switchable frictional engagement control from absolute values of the desired rotational speed difference and the actual rotational speed difference between the input and output sides of the frictional engagement control;

c) adjusting the determined control pressure by a torque reduction input to a governor for limiting torque in the frictional engagement control;

d) adjusting the determined control pressure according to the input rotational speed of the frictional engagement control;

e) determining a starting value for the control pressure of the frictional engagement control;

f) damping and limiting a time shift around the closed loop to stabilize operation of the closed loop; and, g) adjusting the determined control pressure by a value determined by a rotational speed dependent frictional value determined for the frictional engagement control.

2. A method for rotational speed difference regulation of a switchable frictional engagement control in the drive train of a motor vehicle by means of a closed control loop for adjusting a desired pressure (p_soll) on the frictional engagement control, with a desired rotational speed difference as a reference input and the actual rotational speed difference as a controlled variable, at least one other controlled variable being provided wherein the regulation design of the closed control loop is of identical construction for every required utilization of the frictional engagement control and wherein the closed control loop contains a linear governor, function blocks for generating desired value and interference level compensation, and damping members (TP1, TP2, TP3) in a manner such that the shift time of the damped variables per reading step does not exceed a predetermined value so that an actuation of the closed control loop remains within a stable limit for controlling, wherein a) to calculate an actual rotational speed difference of the frictional engagement control, rotational speeds of an input side (n_kan) and of an output side (n_kab) of the frictional engagement control are detected, wherein prior to the formation of a difference, the rotational speed of the output side (n_kab) is equalized by means of a first damping member (TP1) and limited to a defined value per reading step;

b) an output variable of the governor (p_reg) is calculated from an absolute value ($\Delta n\_soll$) of the desired rotational speed difference and an absolute value ($\Delta n$) of the actual rotational speed difference of input and output sides of the frictional engagement control;

c) as an added controlled variable, a reduction torque input (m_red) additively superimposed in the closed control loop immediately before the governor and is used in generating the desired value p_reg;

d) an interference portion of a clutch pressure p_ST is converted from a sign-provided divergence between the actual input torque m_an and a torque on the frictional engagement control in a working point position m_an_offset and into a corresponding equivalent pressure difference on the working point p_ST wherein dynamic pressure portions subject to construction are represented by the corresponding dynamic of rotatory pressure portion p_dyn, which reduces the variable p_ST and which is determined from the Input rotational speed n_kan;

e) as a start value for a control phase an opening pressure (p_offset) of the frictional engagement control is used at the beginning of the control phase;

f) a time shift of a total controlled variable clutch pressure (p_soll*) is equalized in the closed control loop after superposing the input-torque dependent and input-rotational speed dependent interferences on the output variable of the governor (p_reg) by means of a third damping member (TP3) and limited to a defined value per reading step; and g) that before the total controlled variable clutch pressure (p_soll) is superposed on the control system, and as last step in a calculation block (KL_reib) another correction is made relative to a rotational speed dependence of a frictional value of the frictional engagement control.

3. The method according to claim 2, wherein to take into account the actual input torque (m_an) as interference, an input-torque dependent interference portion (p_ST) is calculated wherein a sign-provided divergence between the actual input torque (m_an) and a working point position (m_an_offset) of the frictional engagement control is converted via a calculation block (KL_mt) for conversion to a corresponding equivalent pressure according to the equation $$p_{st} = \Delta m_{an} * \frac{1}{\mu(\Delta n) \cdot r \cdot z \cdot A_K}$$

with:

$\Delta m\_an$: divergence torque at the working point;

$\mu(\Delta n)$: friction coefficient;

$\Delta n$: rotational speed difference on the frictional engagement control;

r: medium frictional radius of the frictional engagement control;

z: number of friction linings;

$A_K$ piston surface;

p_ST pressure difference calculated on the working point; and wherein the input-torque dependent interference portion (p_ST) is then reduced by a dynamic or rotatory pressure portion (p_dyn) which is calculated from the input rotational speed (n_kan) of the frictional engagement control.

4. The method according to claim 3, wherein the application of opening pressure (p_offset) of the frictional engagement control is determined anew upon each shift at the beginning of the control phase.

5. The method according to claim 2, wherein before formation of the rotational speed difference of the frictional engagement control, the rotational speed of the input side (n_kan) is also equalized by means of a damping member or limited to a defined value per reading step.

6. The method according to claim 2, wherein to determine the opening pressure (p_offset) of the frictional engagement control, during control of the frictional engagement control one other control phase is inserted between a filling phase and a control phase, a controlled pressure ramp remaining activated until a corresponding reaction of predetermined magnitude can be detected on the rotational speed curve of the input and output side of the frictional engagement control.

7. The method according to claim 2, wherein a manner of engine engagement is selected so that the reaction time between requirement and actual torque reduction of the Input is as short as possible.

8. The method according to claim 2, wherein an engine engagement for torque reduction of the input is carried out when the difference between the actual rotational speed difference and the desired rotational speed difference exceeds a predetermined threshold.

9. The method according to claim 2, wherein the amount of the torque reduction (m_red) within the scope of the engine engagement is a function of the size of a control difference of the governor.

10. The method according to claim 2, wherein the reference input desired rotational speed difference ($\Delta n\_soll$) is continuously equalized in time or limited to a defined value per reading step so that unsteadiness in the timed curve of the reference input is prevented.

11. The method according to claim 2, wherein the desired rotational speed difference ($\Delta n\_soll$) assumes the value 0 in order to close the frictional engagement control.

12. The method according to claim 2, wherein to carry out other function of the frictional engagement control, only defined rotational speed difference values are given.

* * * * *